(12) United States Patent
Eastman et al.

(10) Patent No.: US 11,584,619 B2
(45) Date of Patent: Feb. 21, 2023

(54) REINFORCED JACKET FOR BELT

(71) Applicant: Otis Elevator Company, Farmington, CT (US)

(72) Inventors: Scott Alan Eastman, Glastonbury, CT (US); Peter J. Walsh, Wethersfield, CT (US); Brad Guilani, Woodstock Valley, CT (US); Daniel A. Mosher, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 188 days.

(21) Appl. No.: 15/871,596

(22) Filed: Jan. 15, 2018

(65) Prior Publication Data
US 2019/0218061 A1     Jul. 18, 2019

(51) Int. Cl.
*B66B 7/06*     (2006.01)
*F16G 1/10*     (2006.01)
(Continued)

(52) U.S. Cl.
CPC ............... *B66B 7/062* (2013.01); *D07B 1/16* (2013.01); *D07B 5/006* (2015.07); *F16G 1/10* (2013.01);
(Continued)

(58) Field of Classification Search
CPC .................................. B66B 7/062; D07B 1/22
See application file for complete search history.

(56) References Cited

U.S. PATENT DOCUMENTS 4,657,526 A * 4/1987 Tangorra .................. F16G 5/20
474/261
6,358,171 B1 * 3/2002 Whitfield ............... B29D 29/08
474/263
(Continued)

FOREIGN PATENT DOCUMENTS

EP     0691217 B1     9/2001
EP     2894119 A1     7/2015
(Continued)

OTHER PUBLICATIONS

European Search Report Issued In EP Application No. 19151833.1, dated Jun. 27, 2019, 10 Pages.
(Continued)

*Primary Examiner* — Minh Truong
(74) *Attorney, Agent, or Firm* — Cantor Colburn LLP

(57) ABSTRACT

A belt includes one or more tension members extending along a length of the belt, and a jacket at least partially enclosing the plurality of tension members. The jacket includes an elastomeric material and a plurality of reinforcing elements located in the elastomeric material to improve fatigue cracking performance of the belt. An elevator system includes a hoistway, an elevator car located in the hoistway, and an elevator belt operably connected to the elevator car to suspend and/or drive the elevator car along the hoistway. The elevator belt includes one or more tension members extending along a length of the belt and a jacket at least partially enclosing the plurality of tension members. The jacket includes an elastomeric material and a plurality of reinforcing elements located in the elastomeric material to improve fatigue cracking performance of the belt.

16 Claims, 4 Drawing Sheets

(51) Int. Cl.
 *D07B 1/16* (2006.01)
 *D07B 5/00* (2006.01)
 *D07B 1/22* (2006.01)

(52) U.S. Cl.
 CPC ........ *D07B 1/22* (2013.01); *D07B 2201/2087* (2013.01); *D07B 2201/2092* (2013.01); *D07B 2205/201* (2013.01); *D07B 2205/2003* (2013.01); *D07B 2205/206* (2013.01); *D07B 2205/2007* (2013.01); *D07B 2205/2021* (2013.01); *D07B 2205/2039* (2013.01); *D07B 2205/2064* (2013.01); *D07B 2205/2071* (2013.01); *D07B 2205/2075* (2013.01); *D07B 2205/2078* (2013.01); *D07B 2205/2082* (2013.01); *D07B 2501/2007* (2013.01)

(56) References Cited

U.S. PATENT DOCUMENTS

| | | | |
|---|---|---|---|
| 6,672,046 B1* | 1/2004 | Prewo | D07B 1/005 57/232 |
| 6,837,340 B2* | 1/2005 | Strauss | B66B 7/068 187/266 |
| 7,619,167 B2 | 11/2009 | Lee et al. | |
| 7,828,121 B2 | 11/2010 | Parrini | |
| 7,926,649 B2 | 4/2011 | Goser | |
| 9,126,805 B2 | 9/2015 | Pelto-Huikko et al. | |
| 9,670,035 B2 | 6/2017 | Orelup et al. | |
| 9,758,345 B2 | 9/2017 | Ach | |
| 10,556,775 B2 | 2/2020 | Wesson et al. | |
| 2002/0039947 A1* | 4/2002 | Hasaka | F16G 1/06 474/263 |
| 2003/0121729 A1 | 7/2003 | Heinz et al. | |
| 2003/0150167 A1 | 8/2003 | Bourgois et al. | |
| 2008/0067010 A1* | 3/2008 | Ach | B29D 29/10 187/250 |
| 2008/0116014 A1 | 5/2008 | Ach | |
| 2010/0068495 A1 | 3/2010 | Rommel et al. | |
| 2010/0133046 A1* | 6/2010 | Allwardt | B66B 7/08 187/251 |
| 2010/0140022 A1* | 6/2010 | Ach | B66B 7/062 187/251 |
| 2011/0000746 A1 | 1/2011 | Pelto-Huikko et al. | |
| 2013/0037353 A1 | 2/2013 | Phillips et al. | |
| 2014/0076669 A1* | 3/2014 | Wesson | D02G 3/32 187/254 |
| 2014/0305744 A1* | 10/2014 | Kere | B66B 7/1238 187/254 |
| 2014/0345978 A1 | 11/2014 | Alasentie et al. | |
| 2015/0307321 A1* | 10/2015 | Breite | B66B 7/062 187/254 |
| 2016/0016757 A1 | 1/2016 | Honkanen et al. | |
| 2016/0083224 A1 | 3/2016 | Kere et al. | |
| 2016/0208889 A1* | 7/2016 | Yoshida | C08K 5/098 |
| 2017/0066630 A1 | 3/2017 | Gurvich et al. | |
| 2017/0159236 A1 | 6/2017 | Lehtinen et al. | |
| 2017/0217729 A1 | 8/2017 | Lehtinen | |
| 2018/0170713 A1* | 6/2018 | Sherrick | D07B 1/005 |
| 2020/0122971 A1* | 4/2020 | Hida | B66B 7/062 |

FOREIGN PATENT DOCUMENTS

| | | |
|---|---|---|
| WO | 2011133872 A2 | 10/2011 |
| WO | 2012170031 A1 | 12/2012 |
| WO | 2014140424 A1 | 9/2014 |
| WO | 2014140424 A9 | 9/2014 |
| WO | 2017155943 A1 | 9/2017 |
| WO | 2017160581 A1 | 9/2017 |

OTHER PUBLICATIONS

Chinese Office Action; Chinese Patent Application No. 201910035269.6; dated Mar. 3, 2021; 10 pages.
European Office Action; European Application No. 19151833.1; dated Apr. 15, 2021; 95 pages.
Chinese Office Action for Chinese Application No. 201910035269.6; dated Sep. 29, 2021, dated Oct. 29, 2021, 9 pages.

* cited by examiner

REINFORCED JACKET FOR BELT

BACKGROUND

Embodiments disclosed herein relate to belts for lifting, suspending and/or moving. More particularly, the present disclosure relates to to load bearing members to suspend and/or drive elevator cars of an elevator system.

Elevator systems are useful for carrying passengers, cargo, or both, between various levels in a building. Some elevators are traction based and utilize load bearing members such as belts for supporting the elevator car and achieving the desired movement and positioning of the elevator car.

Referring to where a belt is used as a load bearing member, a plurality of tension members are embedded in a common jacket. The jacket retains the tension members in desired positions and provides a frictional load path. In an exemplary traction elevator system, a machine drives a traction sheave with which the belts interact to drive the elevator car along a hoistway. Belts typically utilize tension members formed from steel elements, but alternatively may utilize tension members formed from synthetic fibers or other materials, such as carbon fiber composites.

The jacket is typically formed from an elastomeric material. Elastomers have been implemented in a variety of applications ranging from dampening materials, to sealants and adhesives, to protective equipment and beyond. Elastomers are also of great use in applications that require significant fatigue and abrasion resistance coupled with tailored friction and traction performance Elevator belts, conveyor belts, and rollers all require high performance in these properties. While high performance engineered elastomers can be very good, in the most demanding applications, unreinforced materials can still fail by fatigue cracking especially if the rate or extent of deformation is high, temperatures during use are low or a combination of these factors occur.

BRIEF DESCRIPTION

In one embodiment, a belt includes one or more tension members extending along a length of the belt, and a jacket at least partially enclosing the plurality of tension members. The jacket includes an elastomeric material and a plurality of reinforcing elements located in the elastomeric material to improve fatigue cracking performance of the belt.

Additionally or alternatively, in this or other embodiments the plurality of reinforcing elements are aligned to extend parallel to the length of the belt.

Additionally or alternatively, in this or other embodiments the plurality of reinforcing elements have an aspect ratio in the range of 5:1 to 10,000:1.

Additionally or alternatively, in this or other embodiments the plurality of reinforcing elements have an aspect ratio in the range of 10:1 to 1000:1.

Additionally or alternatively, in this or other embodiments the reinforcing elements include one or more of fibers, yarns, and sheets, perforated films or structured open fabrics.

Additionally or alternatively, in this or other embodiments the reinforcing elements are formed from one or more of polyester, PTFE, PVDF, polyamides, silicones, fluoroelastomers, spider silk, cellulose, or rubber.

Additionally or alternatively, in this or other embodiments the reinforcing elements include a surface treatment to promote adhesion of the reinforcing elements to the elastomeric material.

Additionally or alternatively, in this or other embodiments the jacket includes one or more traction and/or friction modifiers.

Additionally or alternatively, in this or other embodiments the traction and/or friction modifiers include wax, blended polymers or graphite materials.

Additionally or alternatively, in this or other embodiments the jacket includes a jacket core having a first jacket configuration and a jacket shell surrounding the jacket core having a second jacket configuration different from the first jacket configuration.

Additionally or alternatively, in this or other embodiments the jacket shell includes a plurality of reinforcing elements, and the jacket core is absent reinforcing elements.

Additionally or alternatively, in this or other embodiments the jacket includes a first jacket side having a first jacket configuration, and a second jacket side having a second jacket configuration different from the first jacket configuration.

Additionally or alternatively, in this or other embodiments the first jacket side includes a plurality of reinforcing elements and the second jacket side is absent reinforcing elements.

In another embodiment, an elevator system includes a hoistway, an elevator car located in the hoistway, and an elevator belt operably connected to the elevator car to suspend and/or drive the elevator car along the hoistway. The elevator belt includes one or more tension members extending along a length of the belt and a jacket at least partially enclosing the plurality of tension members. The jacket includes an elastomeric material and a plurality of reinforcing elements located in the elastomeric material to improve fatigue cracking performance of the belt.

Additionally or alternatively, in this or other embodiments the plurality of reinforcing elements are aligned to extend parallel to the length of the belt.

Additionally or alternatively, in this or other embodiments the reinforcing elements include one or more of fibers, yarns, and sheets, perforated films or structured open fabrics.

Additionally or alternatively, in this or other embodiments the reinforcing elements include a surface treatment to promote adhesion of the reinforcing elements to the elastomeric material.

Additionally or alternatively, in this or other embodiments the jacket includes one or more of wax, a blended polymer or a graphite material to modify traction and/or friction properties of the belt.

Additionally or alternatively, in this or other embodiments the jacket includes a jacket core having a first jacket configuration and a jacket shell surrounding the jacket core having a second jacket configuration different from the first jacket configuration.

Additionally or alternatively, in this or other embodiments the jacket includes a first jacket side having a first jacket configuration, and a second jacket side having a second jacket configuration different from the first jacket configuration.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
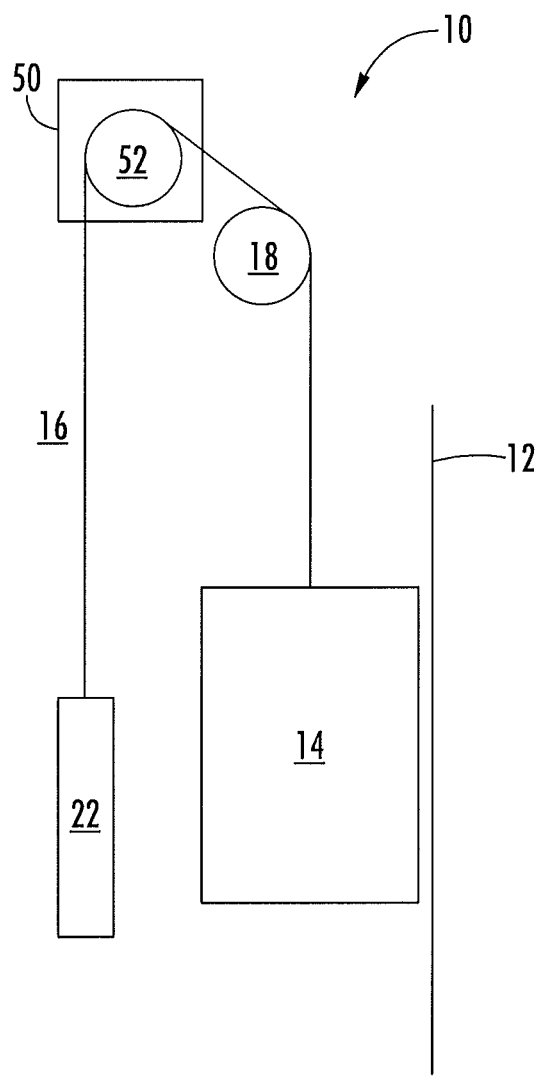
FIG. 1 is a schematic illustration of an embodiment of an elevator system.

Belts are utilized in many applications, in which members are needed for suspending, moving or lifting operations. One such example of application for a belt is an elevator system. While the belt is described herein in the context of an elevator system, one skilled in the art will readily appreciate that the belts disclosed herein may be utilized in other applications. Shown in FIG. 1 is a schematic view of an exemplary traction elevator system 10. Features of the elevator system 10 that are not required for an understanding of the present invention (such as the guide rails, safeties, etc.) are not discussed herein. The elevator system 10 includes an elevator car 14 operatively suspended or supported in a hoistway 12 with one or more belts 16. The one or more belts 16 interact with sheaves 18 and 52 to be routed around various components of the elevator system 10. Sheave 18 is configured as a diverter, deflector or idler sheave and sheave 52 is configured as a traction sheave 52, driven by a machine 50. Movement of the traction sheave 52 by the machine 50 drives, moves and/or propels (through traction) the one or more belts 16 that are routed around the traction sheave 52. Diverter, deflector or idler sheaves 18 are not driven by a machine 50, but help guide the one or more belts 16 around the various components of the elevator system 10. The one or more belts 16 could also be connected to a counterweight 22, which is used to help balance the elevator system 10 and reduce the difference in belt tension on both sides of the traction sheave during operation. The sheaves 18 and 52 each have a diameter, which may be the same or different from each other.

In some embodiments, the elevator system 10 could use two or more belts 16 for suspending and/or driving the elevator car 14 In addition, the elevator system 10 could have various configurations such that either both sides of the one or more belts 16 engage the sheaves 18, 52 or only one side of the one or more belts 16 engages the sheaves 18, 52. The embodiment of FIG. 1 shows a 1:1 roping arrangement in which the one or more belts 16 terminate at the car 14 and counterweight 22, while other embodiments may utilize other roping arrangements.

The belts 16 are constructed to meet belt life requirements and have smooth operation, while being sufficiently strong to be capable of meeting strength requirements for suspending and/or driving the elevator car 14 and counterweight 22.

Figure 2:
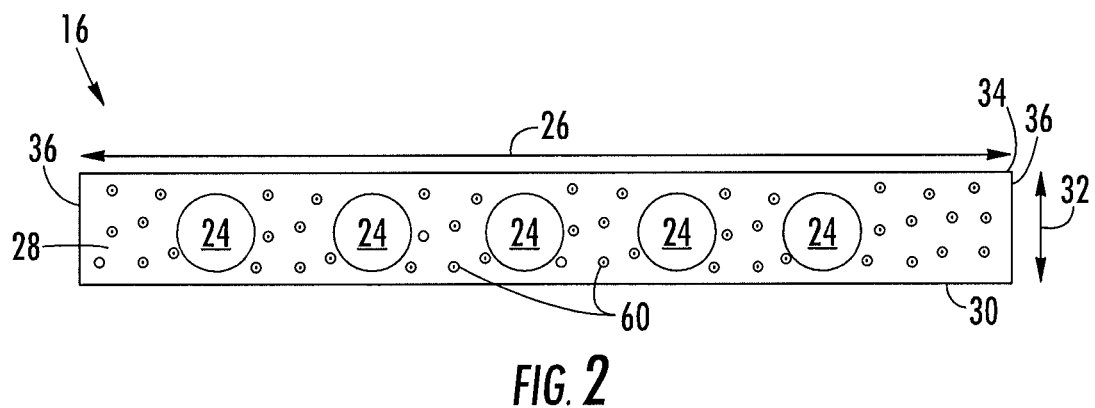
FIG. 2 is cross-sectional view of an embodiment of a belt for an elevator system.

FIG. 2 provides a cross-sectional schematic of an exemplary belt 16 construction or design. The belt 16 includes a plurality of tension members 24 extending longitudinally along the belt 16 and arranged across a belt width 26. The tension members 24 are at least partially enclosed in a jacket 28 to restrain movement of the tension members 24 in the belt 16 and to protect the tension members 24. The jacket 28 defines a traction side 30 configured to interact with a corresponding surface of the traction sheave 52.

The belt 16 has a belt width 26 and a belt thickness 32, with an aspect ratio of belt width 26 to belt thickness 32 greater than one. The belt 16 further includes a back side 34 opposite the traction side 30 and belt edges 36 extending between the traction side 30 and the back side 34. While five tension members 24 are illustrated in the embodiment of FIG. 2, other embodiments may include other numbers of tension members 24, for example, 6, 10 or 12 tension members 24. Further, while the tension members 24 of the embodiment of FIG. 2 are substantially identical, in other embodiments, the tension members 24 may differ in construction from one another.

Figure 3A:
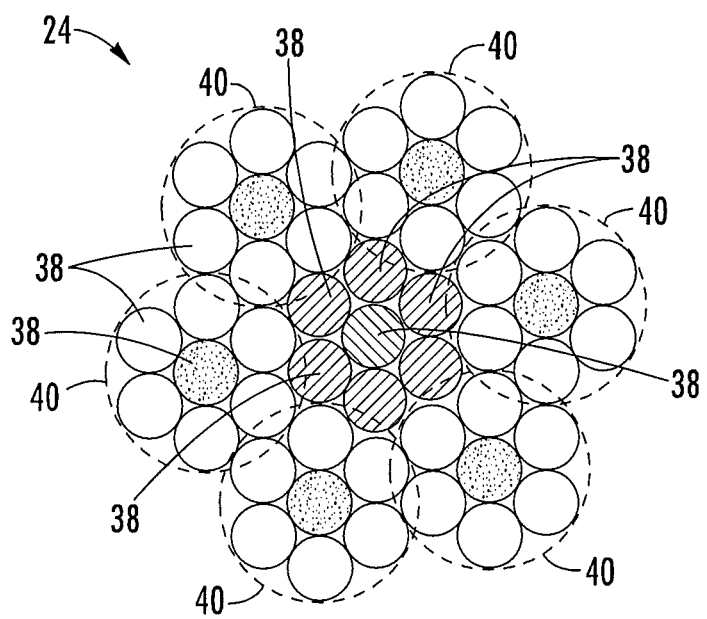
FIG. 3A is a cross-sectional view of an embodiment of a tension member of a belt.
Figure 3B:
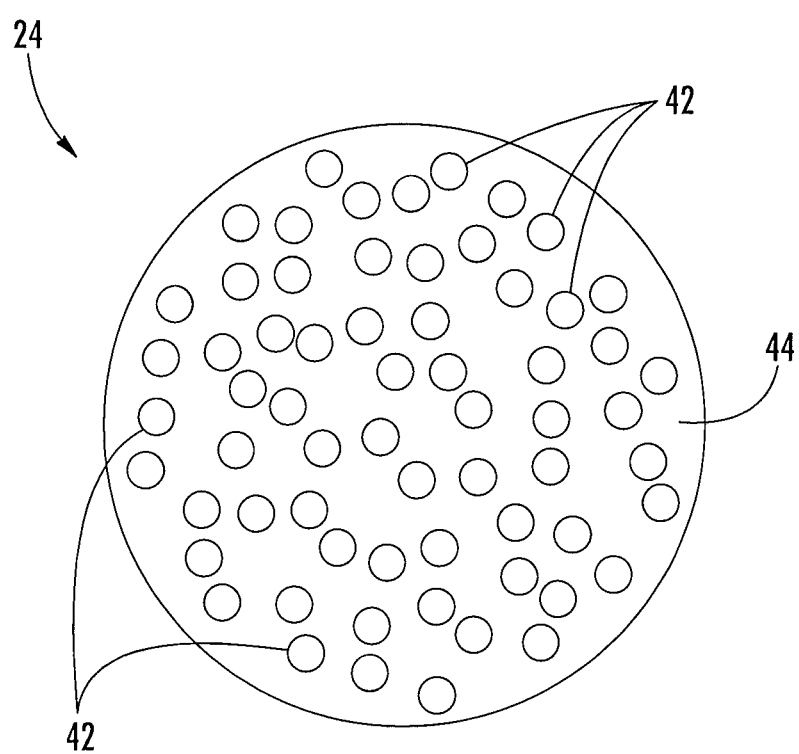
FIG. 3B is a cross-sectional view of another embodiment of a tension member of a belt.

Referring now to FIG. 3A, the tension member 24 may be a plurality of wires 38, for example, steel wires 38, which in some embodiments are formed into one or more strands 40. In other embodiments, such as shown in FIG. 3B, the tension member 24 may include a plurality of fibers 42, such as carbon fiber, glass fiber, basalt fiber, liquid crystal polymer fiber, or aramid fiber, disposed in a matrix material 44. Materials such as but no limited to polyurethane, vinyl ester, or epoxy may be utilized as the matrix material 44.

Referring again to FIG. 2, the jacket 28 may be formed from materials such as the elastomers of thermoplastic and thermosetting polyurethanes, thermoplastic polyester elastomers, ethylene propylene diene elastomer, chloroprene, chlorosulfonyl polyethylene, ethylene vinyl acetate, polyamide, polypropylene, butyl rubber, acrylonitrile butadiene rubber, styrene butadiene rubber, acrylic elastomer, fluoroelastomer, silicone elastomer, polyolefin elastomer, styrene block and diene elastomer, natural rubber, or combinations thereof. Other materials may be used to form the jacket 28 if they are adequate to meet the required functions of the belt 16. For example, a primary function of the jacket 28 is to provide a sufficient coefficient of friction between the belt 16 and the traction sheave 52 to produce a desired amount of traction therebetween. The jacket 28 should also transmit the traction loads to the tension members 24. In addition, the jacket 28 should be wear resistant and protect the tension members 24 from impact damage, exposure to environmental factors, such as chemicals, for example.

To prevent fatigue cracking and/or to arrest cracks in the jacket 28, one or more reinforcing elements 60 are included in the jacket 28. Generically, the types of reinforcing elements 60 utilized are high aspect ratio, 1D or 2D additives (i.e. cylinders or plates) that can be incorporated into the jacket 28 before or during processing of the jacket 28 or the belt 16. Example reinforcing elements 60 include micro and macro fillers such as fibers, yarns, and sheets (perforated films and structured open fabrics) which are effective in providing a crack arresting mechanism to fatigue cracking. Alternatively or additionally, nanofillers such as nanorods, nanotubes, and nanoplatelets, can also be incorporated to improve the fundamental characteristics regarding fatigue cracking of the jacket 28. Rubber materials may be utilized in the reinforcing elements 60 to provide an additional toughening mechanism.

In some embodiments, the reinforcing elements 60 have an aspect ratio in the range of 5:1 to 10,000:1 or more specifically in the range of 7:1 to 5,000:1. In other embodiments, the aspect ratio is in the range of 10:1 to 1000:1. Further, the reinforcing elements 60 are incorporated into the jacket 28, such that the reinforcing elements 60 are aligned so a length of the reinforcing element 60 extends in a direction perpendicular to crack formation in the belt 16. For example if a belt 16 is bent over a sheave 18, it is beneficial to have preferential alignment of the reinforcing elements 60 in the length direction of the belt 60 as cracks would form across the belt width 26. In other embodiments, the reinforcing elements 60 are aligned parallel to the length of the belt 16 within +/−60°. Further, the reinforcing elements 60 may be continuous or discontinuous along the belt 16 length.

The reinforcing elements 60 are selected such that the material does not melt or otherwise degrade in geometry or performance at the processing and operating conditions of the jacket 28. For example if a thermoplastic polyurethane jacket 28 material is processed at 200° C. then reinforcing elements 60 must maintain their shape at least up to 200° C. Additionally, reinforcing element 60 materials that improve fatigue cracking resistance would be elastomeric or otherwise compliant to aid in fatigue resistance and crack arresting. In some embodiments, the reinforcing elements 60 are formed from materials with melting points above 200° C. such as polyester, PTFE, PVDF, polyamides, silicones, fluoroelastomers, spider silk, cellulose, or the like. It is to be appreciated, however, that such materials are merely exemplary, and the use of other materials is contemplated within the scope of the present disclosure. For thermoset polymers, typically the materials selected would be related to the curing temperature of that particular polymer.

The reinforcing elements 60 must be configured to promote adhesion of the reinforcing elements 60 in the jacket 28. To accomplish this, the reinforcing elements 60 may include a coating or other surface treatment to promote adhesion of the reinforcing elements 60 to the elastomeric jacket 28 material. Further, the reinforcing elements 60 may include traction and/or friction modifiers such as wax, blended polymers, or exfoliating fillers (graphite) to adjust friction and traction into the appropriate range for the given application space.

Figure 4:
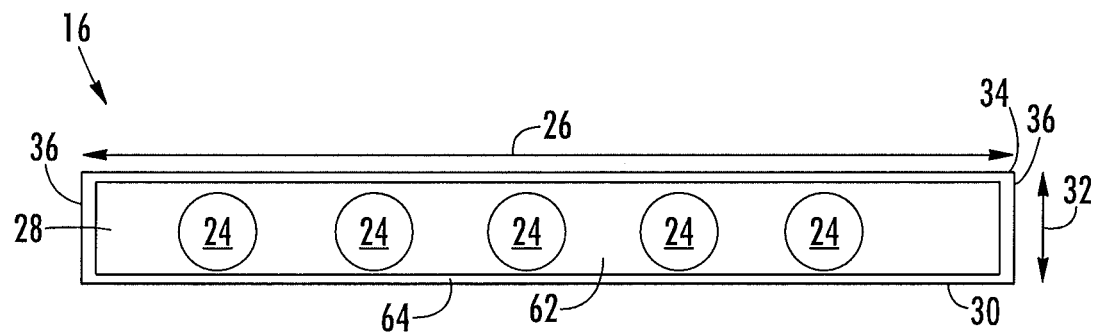
FIG. 4 is a cross-sectional view of another embodiment of an elevator belt.

While in some embodiments, such as the embodiment illustrated in FIG. 2, the reinforcing elements 60 are distributed substantially evenly or equally throughout the jacket 28, in some embodiments, other configurations may be utilized. For example, as shown in FIG. 4, in some embodiments the jacket 28 may have a jacket core 62 and a jacket shell 64 located outboard of the jacket core 62, and defining the traction side 30 and the back side 34 of the belt. In one embodiment, the jacket core 62 may be unreinforced, while the jacket shell 64 includes reinforcing elements 60. Alternatively, the jacket core 62 may include reinforcing elements 60, while the jacket shell 64 may be unreinforced. In another embodiment, both the jacket core 62 and the jacket shell 64, may be reinforced, with the reinforcing elements 60 in the jacket core 62 different from the reinforcing elements 60 in the jacket shell 64. For example, the reinforcing elements 60 in the jacket core 62 may provide crack protection, the reinforcing elements 60 in the jacket shell 64 may provide crack protection, and additionally may address other requirements such as traction performance or wear performance of the jacket 28.

Figure 5:
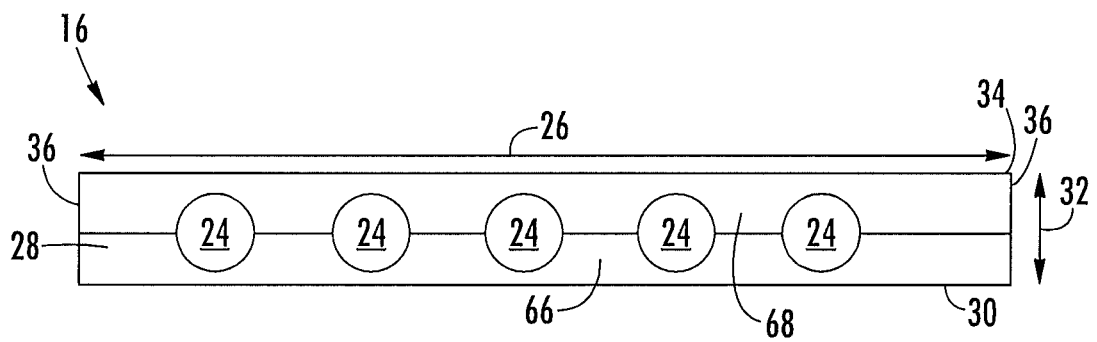
FIG. 5 is a cross-sectional view of yet another embodiment of an elevator belt.

Referring to FIG. 5, a first belt side 66 closest to traction side 30 may have a first configuration, reinforced or unreinforced, while a second belt side 68 closest to the back side 34 may have a second configuration, also reinforced or unreinforced. As such, reinforcing elements 60 utilized in the first belt side 66 may provide, for example, crack protection and traction performance, while the reinforcing elements 60 utilized in the second belt side 68 may address, for example, crack protection.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A belt comprising:
   one or more tension members extending along a length of the belt; and
   a jacket at least partially enclosing the plurality of tension members, the jacket including an elastomeric material and a plurality of reinforcing elements disposed in the elastomeric material including a crack arresting mechanism of the elastomeric material;
   wherein the plurality of reinforcing elements are distributed substantially equally throughout the jacket; and
   wherein the plurality of reinforcing elements includes one or more traction and/or friction modifiers;
   wherein the reinforcing elements are formed from one or more of polyvinylidene fluoride (PVDF), silicones, fluoroelastomers, spider silk, or cellulose;
   wherein the plurality of reinforcing elements are plate shaped.

2. The belt of claim 1, wherein the plurality of reinforcing elements are aligned to extend parallel to the length of the belt.

3. The belt of claim 1, wherein the plurality of reinforcing elements have an aspect ratio in a length and width direction in the range of 5:1 to 10,000:1.

4. The belt of claim 3, wherein the plurality of reinforcing elements have an aspect ratio in the range of 10:1 to 1000:1.

5. The belt of claim 1, wherein the reinforcing elements include a surface treatment to promote adhesion of the reinforcing elements to the elastomeric material.

6. The belt of claim 1, wherein the traction and/or friction modifiers include wax or graphite materials.

7. The belt of claim 1, wherein the jacket includes a jacket core having a first jacket configuration and a jacket shell surrounding the jacket core having a second jacket configuration different from the first jacket configuration.

8. The belt of claim 7, wherein the jacket shell includes a plurality of reinforcing elements, and the jacket core is absent reinforcing elements.

9. The belt of claim 1, wherein the jacket includes a first jacket side having a first jacket configuration, and a second jacket side having a second jacket configuration different from the first jacket configuration.

10. The belt of claim 9, wherein the first jacket side includes a plurality of reinforcing elements and the second jacket side is absent reinforcing elements.

11. An elevator system, comprising:
a hoistway;
an elevator car disposed in the hoistway; and
an elevator belt operably connected to the elevator car to suspend and/or drive the elevator car along the hoistway, the elevator belt comprising:
one or more tension members extending along a length of the belt; and
a jacket at least partially enclosing the plurality of tension members, the jacket including an elastomeric material and a plurality of reinforcing elements disposed in the elastomeric material including a crack arresting mechanism of the elastomeric material;
wherein the plurality of reinforcing elements are distributed substantially equally throughout the jacket; and
wherein the plurality of reinforcing elements includes one or more traction and/or friction modifiers;
wherein the reinforcing elements are formed from one or more of polyvinylidene fluoride (PVDF), silicones, fluoroelastomers, spider silk, or cellulose;
wherein the plurality of reinforcing elements are plate shaped.

12. The elevator system of claim 11, wherein the plurality of reinforcing elements are aligned to extend parallel to the length of the belt.

13. The elevator system of claim 11, wherein the reinforcing elements include a surface treatment to promote adhesion of the reinforcing elements to the elastomeric material.

14. The elevator system of claim 11, wherein the one or more traction and/or friction modifiers includes one or more of wax or a graphite material to modify traction and/or friction properties of the belt.

15. The elevator system of claim 11, wherein the jacket includes a jacket core having a first jacket configuration and a jacket shell surrounding the jacket core having a second jacket configuration different from the first jacket configuration.

16. The elevator system of claim 11, wherein the jacket includes a first jacket side having a first jacket configuration, and a second jacket side having a second jacket configuration different from the first jacket configuration.

* * * * *